(12) United States Patent
Ortega Gutierrez et al.

(10) Patent No.: US 10,677,680 B1
(45) Date of Patent: Jun. 9, 2020

(54) INTERIOR TUBING MONITORING DEVICES

(71) Applicant: Amazon Technologies, Inc., Seattle, WA (US)

(72) Inventors: Felipe Enrique Ortega Gutierrez, Tacoma, WA (US); Theodore Lee, Federal Way, WA (US); Dominic Lebaron, Issaquah, WA (US); Robert Mulyono, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 15/588,337

(22) Filed: May 5, 2017

(51) Int. Cl.
*G01L 5/00* (2006.01)
*G01M 3/36* (2006.01)
*G01M 3/40* (2006.01)
*G05D 7/06* (2006.01)

(52) U.S. Cl.
CPC ............... *G01M 3/36* (2013.01); *G01M 3/40* (2013.01); *G05D 7/0623* (2013.01)

(58) Field of Classification Search
CPC .......... G01M 3/36; G01M 3/40; G01M 3/083; G01M 3/085; G01B 7/16; G01B 7/18; G01B 21/32; F16L 2201/30
See application file for complete search history.

(56) References Cited

U.S. PATENT DOCUMENTS

| | | | |
|---|---|---|---|
| 5,969,618 A | 10/1999 | Redmond | |
| 8,528,385 B2 * | 9/2013 | Raghavendra | G01M 3/047 73/40.5 R |
| 8,746,041 B2 * | 6/2014 | Howard | G01M 3/04 73/40.5 R |
| D712,769 S * | 9/2014 | Betsinger | D10/101 |
| 9,291,521 B2 * | 3/2016 | Raghavendra | G08B 21/20 |
| D755,938 S * | 5/2016 | Taylor | D23/259 |
| 9,435,709 B2 * | 9/2016 | Hastreiter | G01M 3/18 |
| 9,535,024 B2 * | 1/2017 | Betsinger | G01M 3/18 |
| 9,562,822 B2 * | 2/2017 | Wells | G01M 3/02 |
| 9,643,550 B2 * | 5/2017 | Beining | B60R 16/03 |
| 9,677,967 B2 * | 6/2017 | Pereira | F16L 11/086 |
| 9,797,800 B2 * | 10/2017 | Dudar | G01L 5/0028 |
| 9,952,170 B2 * | 4/2018 | Upasani | F16L 11/086 |
| 10,024,465 B2 * | 7/2018 | Al-Atat | F16L 11/127 |
| 10,309,864 B1 * | 6/2019 | Lee | G01M 3/40 |

(Continued)

FOREIGN PATENT DOCUMENTS

| | | |
|---|---|---|
| GB | 1503502 | 3/1978 |
| JP | 2007177847 | 7/2007 |

OTHER PUBLICATIONS

U.S. Appl. No. 15/588,268, filed May 5, 2017, Titled: Exterior Tubing Monitoring Devices.

*Primary Examiner* — Alexander A Mercado
(74) *Attorney, Agent, or Firm* — Kilpatrick Townsend & Stockton LLP

(57) ABSTRACT

Systems, devices, and methods for monitoring flexible tubing connections are described. An example flexible tube device may include a pair of ends and an opening disposed at one of the ends. The opening may define a receiving section to receive a male fitting. The flexible tube may also include a sensing device extending within the flexible tube at the receiving section. The sensing device may be configured to sense an expansion or a contraction of the flexible tube at the receiving section.

19 Claims, 3 Drawing Sheets

(56) References Cited

U.S. PATENT DOCUMENTS

| | | | |
|---|---|---|---|
| 10,333,297 B2 * | 6/2019 | Al-Atat | H02J 1/10 |
| 10,359,387 B2 * | 7/2019 | Krutz | B29C 70/88 |
| 2006/0196252 A1 | 9/2006 | Deckard | |
| 2012/0167669 A1 * | 7/2012 | Raghavendra | G01M 3/047 |
| | | | 73/40.5 R |
| 2013/0220466 A1 | 8/2013 | Zandiyeh et al. | |
| 2013/0277008 A1 * | 10/2013 | Ishikura | F28F 11/00 |
| | | | 165/11.1 |
| 2014/0000742 A1 * | 1/2014 | Betsinger | F16L 57/06 |
| | | | 138/36 |
| 2015/0226622 A1 * | 8/2015 | Cheng | G01L 9/0027 |
| | | | 73/730 |
| 2016/0370252 A1 * | 12/2016 | Dudar | G01L 5/0028 |
| 2017/0089496 A1 * | 3/2017 | Lennon | F16L 13/146 |
| 2018/0074005 A1 * | 3/2018 | Krutz | B29C 70/88 |
| 2018/0304721 A1 * | 10/2018 | Veca | B60H 1/00585 |

\* cited by examiner

INTERIOR TUBING MONITORING DEVICES

CROSS REFERENCE TO RELATED APPLICATIONS

This application is related to co-pending U.S. application Ser. No. 15/588,268, filed May 5, 2017, entitled "EXTERIOR TUBING MONITORING DEVICES", the contents of which are herein incorporated in their entirety.

BACKGROUND

Hoses or other flexible tubes can be used to transport liquid and gas for many different purposes. Under some circumstances, these hoses may be pressurized. For example, in a closed system including a length of hose, a pump can be used to circulate liquid, which may result in the liquid being pressurized within the hose. The hose can be coupled to other lengths of hose, pumps, outlets, inlets, devices, etc. using any one of a variety of hose fittings.

BRIEF DESCRIPTION OF THE DRAWINGS

Various examples in accordance with the present disclosure will be described with reference to the drawings, in which.

DETAILED DESCRIPTION

Figure 1:
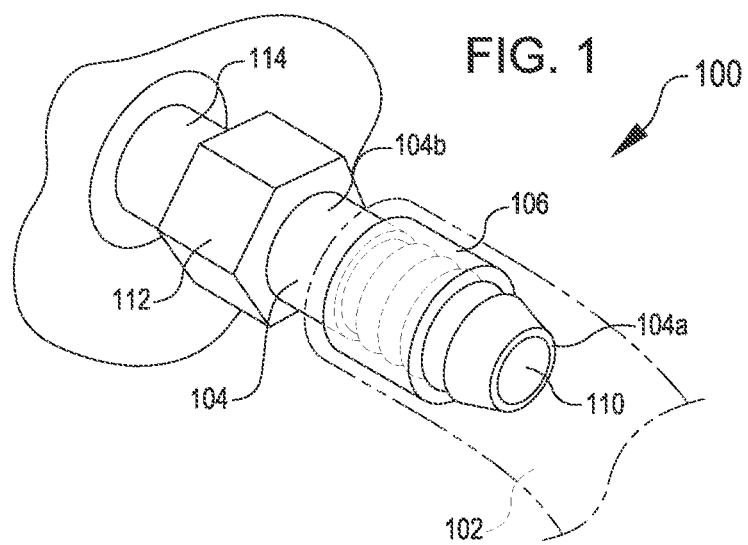
FIG. 1 illustrates a perspective view of a connection monitoring system including a sensing device, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples herein are directed to sensing devices and techniques for using the sensing devices for real-time monitoring of hose couplings (e.g., connections between hoses and fittings). In a testing phase (e.g., in a lab), real-time data from a sensing device can be used to determine a lifecycle of a particular hose coupled to a particular fitting. For example, the particular hose and the particular fitting can be tested until some failure occurs. The lifecycle data can be used to determine when parts should be replaced to avoid the same or similar failures. Under actual conditions (e.g., in a liquid cooling system in a data center), data gathered from the testing phase along with real-time data from a sensing device can be used to monitor the status of a hose and fitting combination in the liquid cooling system in the data center. This real-time monitoring can be useful to maximize the lifetime of the parts, while minimizing the risk of a total failure.

Turning now to a particular example, in this example, a sensing device is provided that enables real-time monitoring of a connection between a flexible hose and a male fitting. The connection can be formed where an inside of the hose overlaps an outside of the male fitting (e.g., a press fit connection). The sensing device can be installed in between the inside of the hose and the outside of the male fitting. For example, the sensing device can take the form of a flexible band that includes an electrical circuit including a resistor disposed in the band. The resistor can be arranged such that pressure exerted on the flexible band as a result of the elasticity of the hose causes a length and thus resistivity of the resistor to change. An increase in resistivity can be correlated to a decrease in pressure between the hose and the male fitting. Likewise a decrease in resistivity can be correlated to an increase in pressure between the hose and the male fitting. Given this arrangement, expansion or contraction of the hose (e.g., distortion of a wall of the hose) in the overlap region can be sensed by the sensing device. Because the connection between the hose and the male fitting is formed by a press fit, expansion of the outside diameter of the hose may be evidence of degradation of the hose itself or at least a loosening of the connection. For example, as a wall of the hose expands or swells, an interior surface of the wall also begins to expand. This expansion pulls the interior surface of the hose away from the outside of the male fitting, which can create a pathway for liquid to leak at the connection. The sensing device gathers data that can be used to predict a future time when such leaks are likely to occur.

Figure 2:
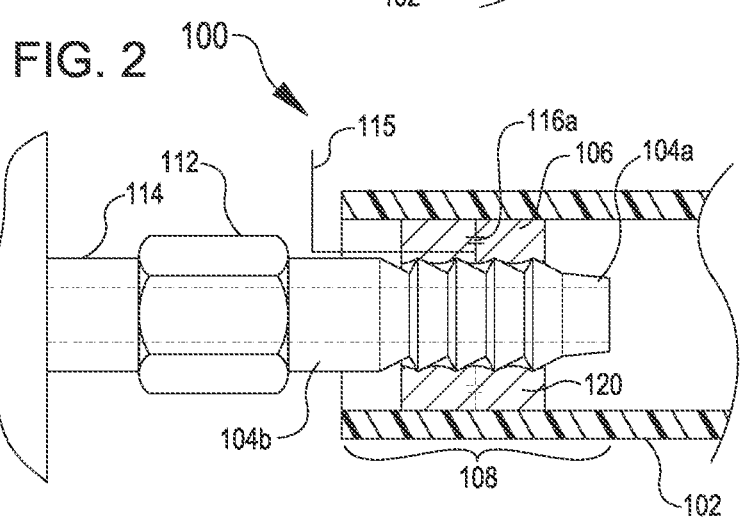
FIG. 2 illustrates a side view including a partial profile of the connection monitoring system and the sensing device from FIG. 1, according to at least one example.
Figure 3:
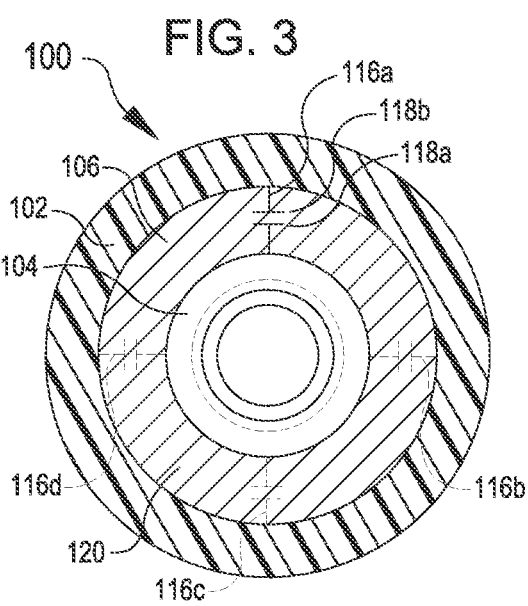
FIG. 3 illustrates an end view including a profile of the connection monitoring system and the sensing device from FIG. 1, according to at least one example.

Turning now to the figures, FIGS. 1-3 illustrate a connection monitoring system 100, according to at least one example. The connection monitoring system 100 includes a flexible tube 102 that extends over a fitting 104. The connection monitoring system 100 also includes a sensing device 106 that extends around the fitting 104 and inside the flexible tube 102. In particular, the sensing device 106 is disposed between an exterior surface of the fitting 104 and an interior surface of the flexible tube 102.

In some examples, the sensing device 106 can be formed as its own part and then attached to the exterior of the fitting 104 or attached to the interior of the flexible tube 102. For example, the sensing device 106 can be screwed onto the fitting 104, pressed onto the fitting 104, snapped onto the fitting 104, or attached in any other suitable manner. As an additional example, the sensing device 106 can be glued or otherwise attached to the interior of the flexible tube 102. In some examples, the sensing device 106 can be integrated or otherwise formed as part of the fitting 104 or the flexible tube 102. For example, the fitting 104 and the sensing device 106 can be formed as a single part. As an additional example, the flexible tube 102 and the sensing device 106 can be formed as a single part. In some examples, the flexible tube 102 includes a repeating pattern of sensing devices 106 spaced longitudinally along the length of the flexible tube 102. In this manner, if a sensing device 106 at an end of the flexible tube 102 fails or if the end of the flexible tube 102 fails (e.g., near the fitting 104), the end of the flexible tube 102 and the sensing device 106 can be severed (e.g., cut off) so as to reveal a second sensing device 106 in the flexible tube 102.

The flexible tube 102 can be any suitable hollow tube or hose designed to carry fluids or gases from one location to another. The flexible tube 102 can be formed from any suitable material having flexible properties. For example, the flexible tube 102 can be formed from nylon, polyurethane, polyethylene, synthetic and natural rubbers, polytetrafluoroethylene (PTFE), polyvinyl chloride, and any other material having similar properties. In some examples, the flexible tube 102 is suitably flexible to enable stretching of the flexible tube 102 over the fitting 104 and the sensing device 106. In particular, an interior diameter of the flexible tube 102 may be slightly smaller than an exterior diameter of the fitting 104 to enable an interference fit between the flexible tube 102 and the fitting 104.

The fitting 104 can have a smooth exterior surface, a barbed surface, or any other suitable surface. The fitting 104 can be formed from any suitable material such as copper, brass, aluminum, plastic, polyvinyl chloride, Nylon, and any other material having similar properties. In some examples, the fitting 104 is more rigid than the flexible tube 102. The fitting 104 can include an opening 110 disposed at a distal end 104a and a connector 112 disposed at a proximal portion 104b. The opening can define a receiving section to receive the fitting 104.

As illustrated in FIG. 2, the flexible tube 102 extends over the fitting 104 at an overlapping region 108. In some examples, the overlapping region 108 corresponds to the receiving section. In particular, the overlapping region 108 can extend between the distal end 104a and the proximal portion 104b. In some examples, the overlapping region 108 extends between the opening 110 and the connector 112. The sensing device 106 can be disposed at any location within the overlapping region 108. For example, as illustrated in FIG. 2, the sensing device 106 can be spaced about equally and longitudinally within the overlapping region 108. In some examples, the sensing device 106 is disposed nearer the distal end 104a or nearer the proximal portion 104b. In some examples, a hose clamp is also disposed within the overlapping region 108 to secure the flexible tube 102 to the fitting 104.

The connector 112 can be used to connect the fitting 104 to a port 114. The port 114 can be an inlet, an outlet, or both an inlet and an outlet. In some examples, the port 114 is connected to a network component, a pump, a reservoir, a radiator, a feed line, a drain line, or any other part of a liquid circulation system.

The sensing device 106 includes an electrical circuit 116a that includes a capacitor disposed in a flexible band. The sensing device 106 is configured to detect expansion, contraction, and/or other distortions of a wall of the flexible tube 102. Generally, as a voltage is applied to the electrical circuit 116a, the sensing device 106 is configured to sense changes in capacitance associated with the capacitor in the electrical circuit 116a. In some examples, the capacitor of the electrical circuit 116a includes two electrodes 118a, 118b. The sensing device 106 also includes a substrate 120 which retains the electrical circuit 116a and includes electrical traces that extend between the electrical circuit 116a, other electrical circuits 116, and a signal source. In some examples, the sensing device 106 receives and sends electrical signals via one or more wires 115. The wire(s) 115 can be connected to a computing device or other system that manages operation of the sensing device 106.

In some examples, the substrate 120 is formed as a pressure pad that includes the electrical circuit 116a and, in some examples, other electrical circuits 116. The electrode 118a, which is disposed closer to the fitting 104, may be a fixed electrode. The electrode 118b, which is disposed closer to a wall of the flexible tube 102, may be a moveable electrode. As the pressure exerted by the flexible tube 102 on the sensing device 106 at the electrical circuit 116a decreases (which may be consistent throughout the entire sensing device 106), the electrode 118b may move further from the electrode 118a. This movement increases the gap between the two electrodes 118 and thereby increases the capacitance of the capacitor. This increase in capacitance can be measured by the connection monitoring system 100 when a voltage is applied and correlated to the decrease in pressure. Likewise, as the pressure exerted by the flexible tube 102 on the sensing device 106 at the electrical circuit 116a increases, the electrode 118b may move towards the electrode 118a. This movement reduces the gap between the two electrodes 118 and decreases the capacitance of the capacitor. This decrease in capacitance can be logged by the connection monitoring system 100 and correlated to the increase in pressure.

In some examples, the gap between the electrodes 118 may include a compressible dielectric material that exerts a motive force on the electrodes 118. This may enable cycling translation of the electrode 118b. In some examples, the sensing device 106 is formed into or from a conventional capacitive or resistive pressure sensing pad. For example, a conventional planar pressure sensing pad can be retrofitted to provide circumferential pressure monitoring. In some examples, the sensing device 106, whether formed from a conventional pressure sensing pad or not, may include a suitably flexible material to withstand deformation that occurs from the force exerted by the flexible tube 102 and the fitting 104 on the sensing device 106.

In some examples, the sensing device 106 includes more than one electrical circuit 116a, each including its own capacitor, a few of which are labeled in FIG. 3 (e.g., 116b-116d). The electrical circuits 116 can be arranged circumferentially about the sensing device 106 and may be offset at some fixed interval (e.g., every 90 degrees, every 45 degrees, every 22.5 degrees, etc.). In some examples, the sensing devices 106 are held within an array of electrical circuits, with each electrical circuit including its own capacitor. In some examples, the capacitors of the array of electrical circuits 116 are formed from sets of orthogonal overlapping conductor strips. In some examples, capacitors can be formed at each point where one strip overlaps another.

Figure 4:
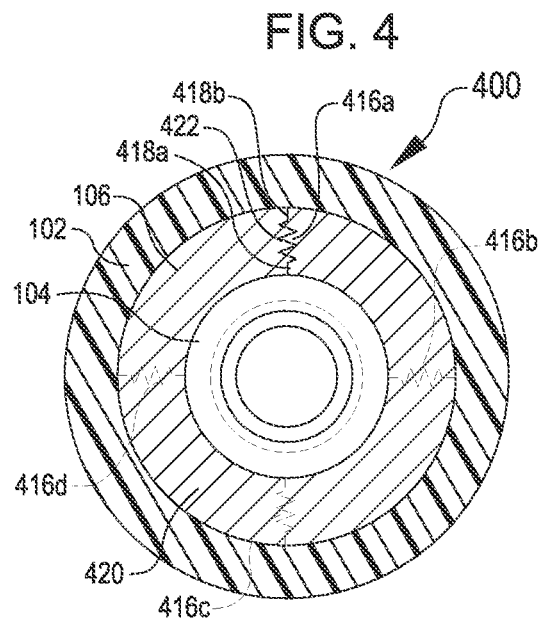
FIG. 4 illustrates an end view including a profile of the connection monitoring system from FIG. 1 including a sensing device, according to at least one example.

FIG. 4 illustrates the connection monitoring system 400, according to at least one example. The connection monitoring system 400 is an example of the connection monitoring system 100. Instead of the sensing device 106, the connection monitoring system 400 includes the sensing device 406 disposed between the fitting 104 and the flexible tube 102 within the overlapping region 108.

The sensing device 406 includes an electrical circuit 416a that includes a resistor. The sensing device 406 is configured to detect expansion, contraction, and/or other distortions of a wall of the flexible tube 102. Generally, as voltage is applied to the electrical circuit 416a, the sensing device 406 is configured to sense changes in resistivity associated with the resistor in the electrical circuit 416a. In some examples, the resistor of the electrical circuit 116a includes two electrodes 418a, 418b and a sensing area 422 electrically connected to two electrodes 418. The sensing device 106 also includes a substrate 420 which retains the electrical circuit 416a and includes electrical traces that extend between the electrical circuit 416a, other electrical circuits 416, and a signal source.

The sensing area 422 may include a metallic pattern having some predefined shape. Deformation of the metallic pattern may increase and/or decrease a measured resistivity of the electrical circuit 416a. As the pressure exerted by the flexible tube 102 on the sensing device 406 at the sensing area 422 of the electrical circuit 416a decreases (which may be consistent throughout the entire sensing device 406), the length of the metallic pattern may increase. This increase in length of metallic pattern increases the resistivity of the resistor. This increase in resistivity can be measured by the connection monitoring system 400 when a voltage is applied and may be correlated to the decrease in pressure. Likewise, as the pressure exerted by the flexible tube 102 on the sensing device 406 at the electrical circuit 416a increases, the length of the metallic pattern may decrease. This decrease in length of metallic pattern decreases the resistivity of the resistor. This decrease in resistivity can be measured by the connection monitoring system 400 when a voltage is applied and may be correlated to the increase in pressure.

In some examples, the sensing device 406 includes more than one electrical circuit 416a, each including its own resistor, a few of which are labeled (e.g., 416b-416d). The electrical circuits 416 can be arranged circumferentially about the sensing device 406 and may be offset at some fixed interval (e.g., every 90 degrees, every 45 degrees, every 22.5 degrees, etc.). In some examples, the sensing devices 406 are held within an array of electrical circuits, with each electrical circuit 416 including its own resistor.

In some examples, the sensing device 406 includes a pressure-sensing resistor. A typical pressure-sensing resistor may be formed from a conductive polymer sheet. The sheet can be formed into any suitable shape such as a cylinder to be mounted between the fitting 104 and the flexible tube 102. The resistance of the conductive polymer may change in a predictable manner in response to the application of pressure to its surface (e.g., from the flexible tube 102 and/or the fitting 104). In some examples, a pressure-sensing resistor is formed from an ink that can be applied to a substrate by screen printing. The conductive polymer sheet can include electrically conducting particles and electrically non-conducting particles suspended in matrix. Applying a force to the surface of the conductive polymer causes particles to touch conducting electrodes, which changes the resistance of the film.

Figure 5:
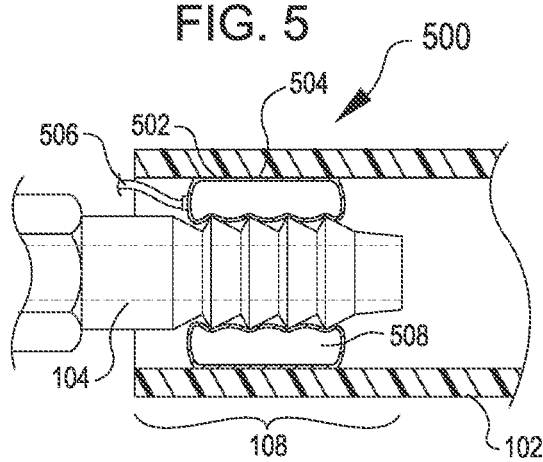
FIG. 5 illustrates a side view including a partial profile of a connection monitoring system including a sensing device, according to at least one example.
Figure 6:
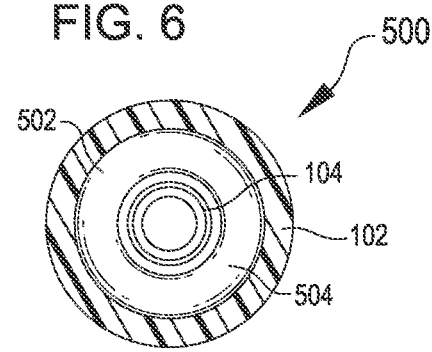
FIG. 6 illustrates an end view including a profile of the connection monitoring system and the sensing device from FIG. 5, according to at least one example.

FIGS. 5 and 6 illustrate a connection monitoring system 500, according to at least one example. The connection monitoring system 500 is an example of the connection monitoring systems 100 and 400. The connection monitoring system 500 includes the flexible tube 102 that extends over the fitting 104 and a sensing device 502 that extends around the fitting 104. Like in the connection monitoring systems 100 and 400, the sensing device 502 extends between the fitting 104 and between the fitting 104 and the flexible tube 102 within the overlapping region 108.

The sensing device 502 is configured to detect expansion, contraction, and/or other distortions of a wall of the flexible tube 102. The sensing device 502 includes a pressurized tube 504 and a pressure sensing device 506. The pressurized tube 504 extends around an exterior portion of the fitting 104 within the overlapping region 108. The pressurized tube 504 may be formed from a flexible material having elastic properties such as rubber, plastic, and other similar materials. The pressurized tube 504 can have a generally cylindrical shape with a hollow opening (e.g., donut shaped). When mounted, the fitting 104 may be disposed within the hollow opening of the pressurized tube 504. In particular, the pressurized tube 504 can be stretched over the fitting 104 such that an inward surface that defines the hollow opening is in physical contact with an exterior surface of the fitting 104.

The pressurized tube 504 includes a chamber 508. The chamber 508 can be defined by a first wall offset a first radial distance from a central axis of the pressurized tube and a second wall offset a second radial distance from the central axis. The first wall and the second wall can extend circumferentially about the central axis, and corresponding top and bottom portions can connect the first wall and the second wall.

The chamber 508 can be filled with a compressible liquid or a compressible gas. For example, the chamber 508 can be filled with high-density oil (e.g., 0.0316 pounds per cubic inch). Other compressible liquids or gases that have greater densities or lower densities may also be used. In some examples, the pressurized tube 504 may include more than one chamber 508, which may be filled with the same or different compressible fluids or gases.

The pressure sensing device 506 can be in fluid communication with the chamber 508. The pressure sensing device 506 can be configured to measure pressure within the chamber 508. In some examples, the pressurized tube 504 includes a valve and the pressure sensing device 506 is attached to the valve. In some examples, the valve is used to add and remove liquid or gas from the chamber 508. In some examples, the pressure sensing device 506 is a separate device that is used to read pressure via an access port of the pressurized tube 504.

The pressure sensing device 506 may be any suitable sensor or set of sensors configured to measure pressure within the chamber 508. Thus, the pressure sensing device 506 may be an absolute pressure sensor, a gauge pressure sensor, a differential pressure sensor, a sealed pressure sensor, or other pressure sensor. Pressure sensing technology that can be used to implement the pressure sensing device 506 includes, for example, force collector types (e.g., piezoresistive strain gauge, capacitive, electromagnetic, piezoelectric, optical, and/or potentiometric), resonant collector types, thermal collector types, ionization collector types, or other similar technologies.

When the flexible tube 102 contracts and expands, the pressure inside the pressurized tube 504 (e.g., within the chamber 508) will change accordingly. This may be a result of pressure changes between an interior surface of the flexible tube 102 and the exterior surface of the pressurized tube 504. The pressure sensing device 506 can be configured to measure pressure in the chamber 508 as that pressure varies over time. These changes in pressure can be correlated to degradation of the flexible tube 102, thus, indicating an end of the lifecycle of the flexible tube 102.

Figure 7:
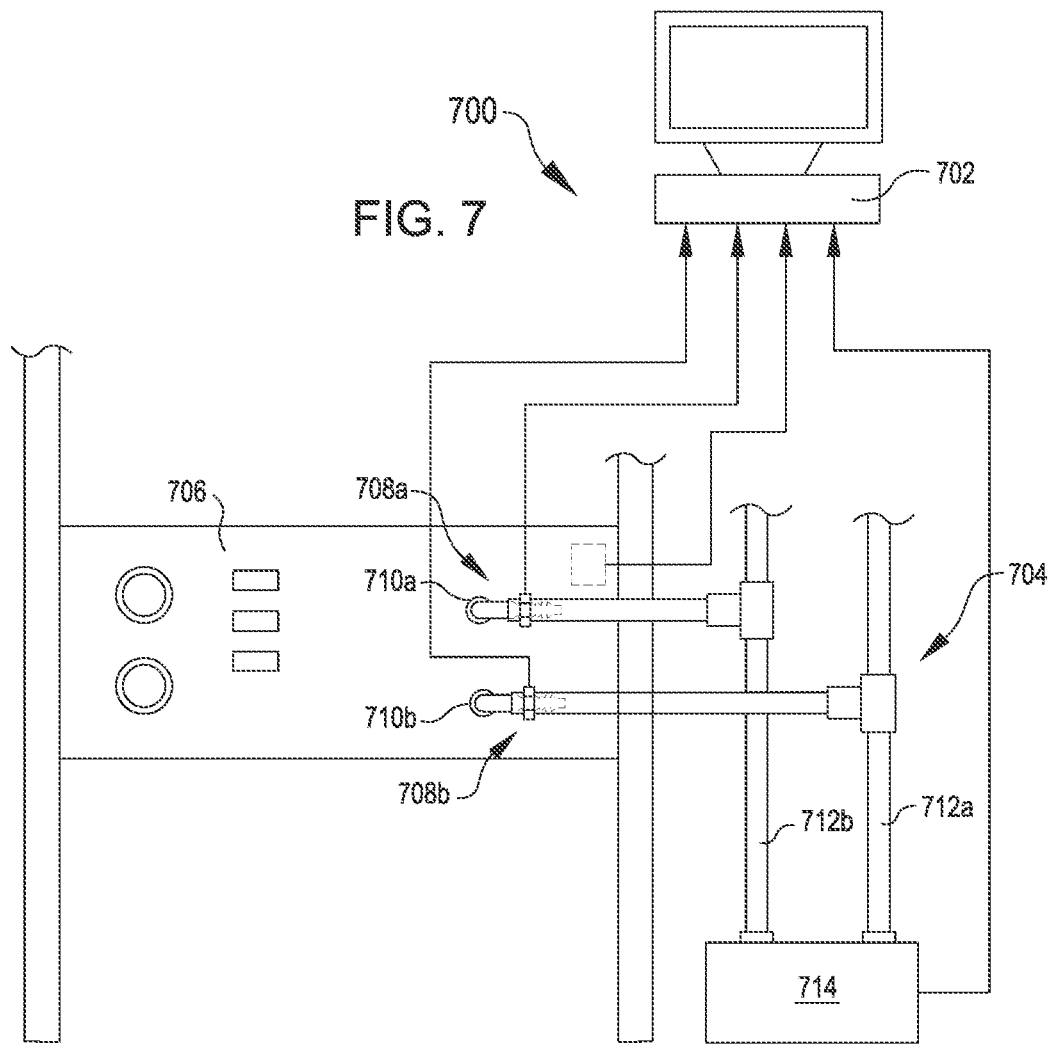
FIG. 7 illustrates a connection analysis system including sensing devices, according to at least one example.

FIG. 7 illustrates an example connection analysis system 700, according to at least one example. The connection analysis system 700 can include a computer system 702, a liquid circulation system 704, a ported component 706, and one or more connection monitoring systems 708. The connection monitoring system 708 is an example of the connection monitoring systems 100, 400, and 500 described herein. Thus, the connection monitoring systems 708 can include one or more sensing devices to monitor ports 710 (e.g., connections between flexible tubes and male fittings) of the ported component 706.

Generally, the connection analysis system 700 can be used to test the connections made at the ports 710 under simulated conditions and/or can be used to monitor the connections made at the ports 710 under live conditions. Under simulated conditions, the connection analysis system 700 may be used to run one or more tests on the connections at the ports 710 until the connections fail and record data relating to the tests and the failure. The tests can be run in a laboratory environment or some simulated, actual environment.

Under live conditions, the connection analysis system 700 may be used to monitor the connections and the ports 710 on an ongoing basis, generate alarm signals before failure occurs, and communicate such alarm signals to the appropriate systems and/or operators for responding.

To this end, the computer system 702 can be configured to gather sensor data detected by the connection monitoring systems 708, gather condition sensor data from condition sensors (e.g., leak detection sensors, liquid circulation system pressure sensors, and other sensors) of the connection analysis system 700, manage operation of the liquid circulation system 704, and/or manage operation of the ported component 706. The computer system 702 can also be configured to compute lifecycles of connections at the ports 710, predict failure of the connections at the ports 710, and perform other suitable techniques described herein.

The computer system 702 includes one or more computing devices, each of which can include a processor, memory, storage, input/output components, communications ports and/or antennas, and any other suitable component to enable the techniques described herein. The processor of the computer system 702 may be implemented as appropriate in hardware, computer-executable instructions, firmware, or combinations thereof. Computer-executable instruction or firmware implementations of the processor may include computer-executable or machine-executable instructions written in any suitable programming language to perform the various functions described.

In some examples, the processor may be a microprocessor, a digital signal processor (DSP), an application-specific integrated circuit (ASIC), field programmable gate arrays (FPGAs), state machines, or other processing means. Such processing means may further include programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

The communication ports may include a wireless communication link and may include wireless interfaces, such as IEEE 802.11, BlueTooth™, radio frequency identification (RFID), near-field communication (NFC), or radio interfaces for accessing cellular telephone networks (e.g., transceiver/antenna for accessing a CDMA, GSM, UMTS, or other mobile communications network). In some aspects, the communication ports may be a wired communication link and may include interfaces, such as Ethernet, USB, IEEE 1394, fiber optic interface, voltage signal line, or current signal line.

The liquid circulation system 704 can include a plurality of lines or hoses 712 in fluid communication with a pump 714 and the ports 710. In some examples, the pump 714 is configured to circulate a liquid into the ported component 706 via the hose 712a and the port 710a and out of the ported component 706 via the hose 712b and the port 710b. For example, the liquid circulation system 704 can be configured to provide liquid cooling to certain components such as the ported component 706 (e.g., rack-mountable server components). In some examples, the ported component 706 is part of liquid circulation system 704 (e.g., a reservoir, a radiator, etc.). The pump 714 can be any suitable pump configured to move liquid through the liquid circulation system 704. In some examples, the pump 714 pressurizes the liquid circulation system 704, but does not otherwise move liquid through the liquid circulation system 704. The liquid used in the liquid circulation system 704 may be water, glycol, water-glycol mixtures, and any other suitable liquid.

In a testing or simulated arrangement, different types of liquids, tubes, fittings, and the like can be tested under various operating conditions (e.g., temperatures, pressures, changes in temperature, changes in pressure, changes in voltage applied to pumps, changes to composition of fluids, etc.) to determine degradation of the connections (e.g., the flexible tube) at the ports 710 over time. These operating conditions can be selected to function as acceleration factors on the tests. This enables determining lifecycle (e.g., from installation to failure) in much less time than doing so under normal operating conditions.

As introduced herein, condition sensors can be used to sense conditions of the connection analysis system 700. Using data from the condition sensors, the computer system 702 can determine when a condition has occurred that is indicative of failure of the ports 710. For example, liquid detection sensors can be used to detect liquid at or around the ports 710. Based on this data, it can be determined that leaks have occurred at the ports 710 (e.g., a leak condition). In some examples, pressure sensors can be used to monitor the pressure within vessels of the connection analysis system 700 (e.g., flexible tubes, lines, or hoses such as the lines or hoses 712). A decrease in pressure in these vessels may be evidence of a leak within the system (e.g., at the ports 710).

In a real-time monitoring arrangement, the connection analysis system 700 can include any suitable telemeters to enable remote communications with the computer system 702 and any other components of the connection analysis system 700. For example, the connection monitoring systems 708 may include telemeters to share their data wirelessly with the computer system 702.

In some examples, the computer system 702 is part of a larger computer system that manages operation of systems within a facility such as a data center. For example, such a larger computer system may manage operation of mechanical systems (e.g., heating, ventilation, and air conditioning (HVAC), humidification, dehumidification, pressurization, etc.), electrical systems, fire suppression systems, security systems, and any other systems of the data center. In some examples, the computer system 702 and/or the larger computer system may be configured to power off/on the pump 714, depressurize/pressurize the liquid circulation system 704, power off/on the ported component 706, and perform any other changes based on sensor data received from the connection monitoring systems 708. For example, if the computer system 702 determines, based on sensor data from the connection monitoring system 708a, that the connection at the port 710a is likely to fail, the computer system 702 may send signals to the pump 714, the ported component 706, and/or other systems to avoid the failure from occurring or at least minimize its effect.

Figure 8:
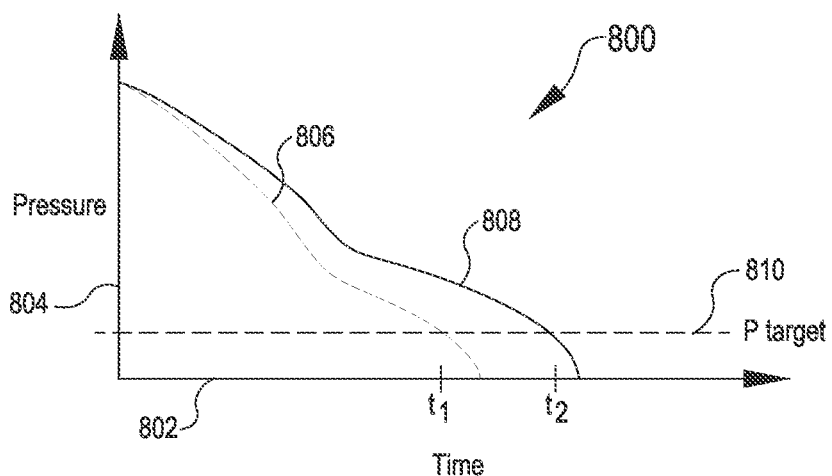
FIG. 8 illustrates an example graph illustrating measurements taken using sensing devices in a system such as illustrated in FIG. 7.

FIG. 8 illustrates an example graph 800 illustrating measurements taken using sensing devices of the connection analysis system 700, according to at least one example. The graph 800 includes time along an X axis 802 and pressure along a Y axis 804. The pressure measurements along the Y axis 804 may have been collected using a connection monitoring system 708.

The graph 800 also includes two lines 806 and 808 and a pressure target 810. Each line represents results of a test taken using the connection analysis system 700. For example, the line 806 represents pressure over time under a first set of operating conditions (e.g., liquid temperature, liquid pressure, pump voltage, liquid properties (e.g., viscosity, density, etc.), and other similar conditions). The line 808 represents pressure over time under a second set of operating conditions that may be different from the first set of operating conditions. Decrease in pressure of the lines 806 and 808 may be representative of expansion of a flexible hose and an increase in likelihood of failure of the connection between the flexible hose and a fitting. The pressure target 810 may be a measured value (e.g., a pressure measured by a sensing device at which one or more connections failed under one or more tests), a computed value (e.g., a value that is 10% less than a pressure at which connections are very likely to fail), or any other suitable value.

In any event, the pressure target 810 may be used to compare the two tests represented by the two lines 806 and 808. For example, the first test (e.g., represented by the line 806) intersects with the pressure target 810 at time 1 and the second test (e.g., represented by the line 808) intersects with the pressure target 810 at time 2. Thus, the conditions present in the second test allowed for the connection to operate for a longer duration than the first test before reaching the pressure target 810.

Figure 9:
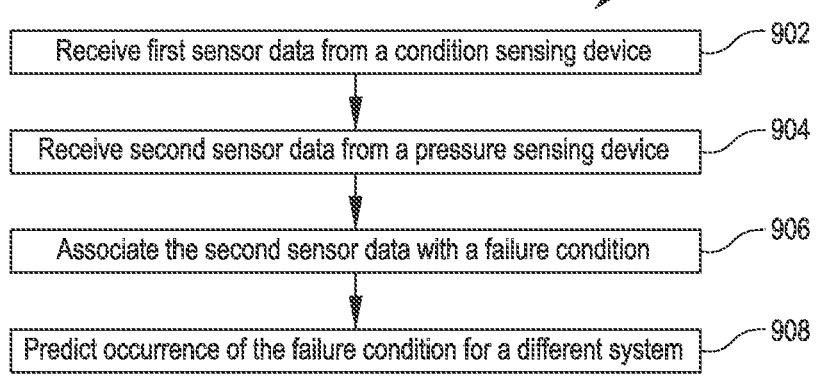
FIG. 9 illustrates a flow diagram depicting example acts for implementing techniques relating to monitoring connections, according to at least one example.
Figure 10:
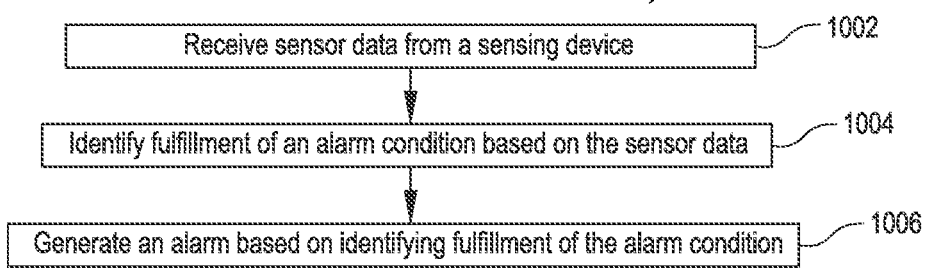
FIG. 10 illustrates a flow diagram depicting example acts for implementing techniques relating to monitoring connections, according to at least one example.

FIGS. 9 and 10 illustrate example flow diagrams depicting processes 900 and 1000 as described herein. The processes 900 and 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 9 illustrates a flow diagram depicting the process 900 for implementing techniques relating to monitoring tubing connections, according to at least one example. The computer system 702 (FIG. 7) may perform the process 900 of FIG. 9.

The process 900 may begin at 902 by receiving first sensor data from a condition sensing device. In some examples, the first sensor data indicates occurrence of a failure condition of a connection at an overlapping region between a flexible tube and a tube fitting. The occurrence of the failure condition can happen at a first time during a first time period. The first time period can be a test period.

In some examples, the first time period is associated with a first set of system operating conditions including at least one of a liquid type condition, a liquid temperature condition, an operating pressure condition, a tube permeability condition, a liquid property condition, or a circulation pump output condition. At least one of the first set of system operating conditions may function as an acceleration factor for the system.

At 904, the process 900 may include receiving second sensor data from a pressure sensing device. The second sensor data may be representative of expansion of the flexible tube within the overlapping region as sensed by the pressure sensing device and occurring during the first time period. The pressure sensing device can include an electrical circuit and can be configured to sense changes in an electrical property associated with the electrical circuit (e.g., capacitance or resistivity).

At 906, the process 900 may include associating the second sensor data with a failure condition.

At 908, the process 900 may include predicting occurrence of the failure condition for a different system. In some examples, the different system can include a different flexible tube coupled to a different tube fitting. Predicting occurrence of the failure condition may be based on associating the second sensor data with the failure condition. For example, based upon the association of the second sensor data with the failure condition (906), a new failure condition can be predicted utilizing second sensor data with the different system. For example, if a failure occurred at 20 PSI for the first system, then a failure may be predicted to be the same (20 PSI) for the second system, or may be calculated based upon differences in the two systems.

In some examples, the flexible tube includes a liquid within the inside of the flexible tube and an interior of the tube fitting. In this example, the failure condition of the flexible tube may include a leak of some of the liquid at the overlapping region or a pressure value of the liquid in the flexible tube meeting a pressure threshold. The pressure threshold may be a high pressure threshold or a low pressure threshold. For example, if the pressure within the flexible tube meets or falls below some low pressure threshold, then the failure condition may be fulfilled.

FIG. 10 illustrates a flow diagram depicting the process 1000 for implementing techniques relating to monitoring tubing connections, according to at least one example. The computer system 702 (FIG. 7) may perform the process 1000 of FIG. 10.

The process 1000 may begin at 1002 by receiving sensor data from a sensing device. In some examples, the sensor data may be representative of an expansion or a contraction of a flexible tube at a region of the flexible tube that overlaps a male fitting. The sensing device may extend around an exterior portion of the male fitting in between the male fitting and the flexible tube within the region.

At 1004, the process 1000 may include identifying fulfillment of an alarm condition based on the sensor data. In some examples, identifying fulfillment of the alarm condition includes identifying that a portion of the sensor data is less than or equal to a predefined pressure value.

At 1006, the process 1000 may include generating an alarm based on identifying fulfillment of the alarm condition. In some examples, generating the alarm can include sending a signal to a liquid circulation system to stop circulating liquid within the flexible tube. Generating the alarm can also include sending a message to a human operator (e.g., via a user device) that identifies the failure, a location of the sensing device, and any other suitable information to enable the human operator to respond to the alarm.

Based at least in part on the disclosure and teachings provided herein, a person of ordinary skill in the art will appreciate other ways and/or methods to implement the various examples. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
   a tube fitting comprising an exterior fitting surface;
   a flexible tube comprising an interior surface and an exterior surface, the flexible tube coupled to the tube fitting at an overlapping region such that a portion of the interior surface of the flexible tube surrounds a portion of the exterior fitting surface;
   a pressure sensing device rigidly attached to the tube fitting and disposed within the overlapping region between the portion of the exterior fitting surface and the portion of the interior surface of the flexible tube, the pressure sensing device comprising an electrical circuit, the pressure sensing device configured to sense changes in an electrical property of the electrical circuit;
   a condition sensing device configured to sense a condition of the flexible tube; and
   a computing device in communication with the pressure sensing device and the condition sensing device, the computing device configured to:
      receive first sensor data from the condition sensing device indicating occurrence of a failure condition of the flexible tube at a first time during a first time period;
      receive second sensor data from the pressure sensing device, the second sensor data representative of expansion of the flexible tube within the overlapping region as sensed by the pressure sensing device and occurring during the first time period; and
      associate the second sensor data with the failure condition.

2. The system of claim 1, wherein the computing device is further configured to predict occurrence of the failure condition for a different system comprising a different flexible tube coupled to a different tube fitting based on associating the second sensor data with the failure condition.

3. The system of claim 1, wherein the electrical circuit comprises a resistor and the electrical property is resistivity.

4. The system of claim 1, wherein the first time period is associated with a first set of system operating conditions comprising a liquid type condition, a liquid temperature condition, an operating pressure condition, a liquid property condition, a tube permeability condition, or a circulation pump output condition.

5. A flexible tube, comprising:
   a first end and a second end;
   an opening at the first end, the opening defining an overlapping region to receive a male fitting; and
   a sensing device connected to an interior surface of the flexible tube within the overlapping region, the sensing device being configured to sense an expansion or a contraction of the flexible tube at the overlapping region, wherein the sensing device is configured to contact the interior surface of the flexible tube and an exterior surface of the male fitting when the male fitting is inserted into the opening.

6. The flexible tube of claim 5, wherein the sensing device is a pressure pad comprising an electrical circuit disposed within a substrate, the sensing device configured to sense changes in an electrical property of the electrical circuit.

7. The flexible tube of claim 6, wherein the electrical circuit is one of a plurality of electrical circuits disposed within the substrate, each electrical circuit of the plurality of electrical circuits configured to sense respective changes in the electrical property of the respective electrical circuit.

8. The flexible tube of claim 6, wherein the electrical circuit comprises a resistor and the electrical property is resistivity.

9. The flexible tube of claim 5, wherein the sensing device comprises:
a pressurized tube, wherein a chamber of the pressurized tube is filled with a compressible liquid or a compressible gas; and
a pressure sensing device in fluid communication with the chamber and configured to measure pressure within the chamber.

10. The flexible tube of claim 9, wherein the compressible liquid is oil.

11. The flexible tube of claim 5, wherein the expansion of the flexible tube at the overlapping region is indicative of a leak between the flexible tube and the male fitting.

12. The flexible tube of claim 5, wherein:
the sensing device is a pressure sensing device; and
the pressure sensing device is configured to share sensor data with a computing device, the computing device configured to associate the sensor data with a failure of the flexible tube, the sensor data representative of the expansion of the flexible tube at the overlapping region as sensed by the pressure sensing device.

13. The flexible tube of claim 5, wherein:
the sensing device is a first sensing device;
the flexible tube further comprises a second sensing device identical to the first sensing device, the second sensing device connected to the interior surface of the flexible tube and spaced longitudinally from the first sensing device such that the first sensing device is disposed between the opening and the second sensing device.

14. The flexible tube of claim 13, wherein the flexible tube is severable at a longitudinal location between the first sensing device and the second sensing device.

15. The flexible tube of claim 5, wherein the flexible tube is configured to carry a liquid to a network component in which the male fitting is attached.

16. A system, comprising:
a network component comprising a fitting;
a liquid circulation system comprising a flexible tube attached to the fitting to form a connection between the flexible tube and the fitting, the liquid circulation system configured to circulate a liquid to the network component via the connection;
a sensing device extending between an exterior surface of the fitting and an interior surface of the flexible tube, the sensing device extending within an overlapping region where a portion of the interior surface of the flexible tube extends over at least a portion of the exterior surface of the fitting to form the connection, wherein the sensing device is configured to contact the interior surface of the flexible tube and the exterior surface of the fitting when the flexible tube is attached to the fitting; and
a computing device in communication with the sensing device, the computing device configured to:
receive sensor data from the sensing device, the sensor data representative of an expansion or a contraction of the flexible tube within the overlapping region;
identify fulfillment of an alarm condition based on the sensor data; and
generate an alarm based on identifying fulfillment of the alarm condition.

17. The system of claim 16, wherein identifying fulfillment of the alarm condition comprises identifying that a pressure value described by the sensor data is less than or equal to a predefined pressure value.

18. The system of claim 16, wherein generating the alarm comprises sending a first signal to the liquid circulation system to stop circulating the liquid or sending a second signal to the network component to power off.

19. The system of claim 16, wherein the sensing device is a pressure pad comprising an electrical circuit disposed within a substrate, the sensing device configured to sense changes in an electrical property associated with the electrical circuit.

* * * * *